US006618356B1

(12) United States Patent
Bonaventure

(10) Patent No.: US 6,618,356 B1
(45) Date of Patent: Sep. 9, 2003

(54) METHOD FOR POLICING DATA TRAFFIC, A DATA TRAFFIC POLICER REALIZING SUCH A METHOD AND A TELECOMMUNICATION NETWORK INCLUDING SUCH A POLICER

(75) Inventor: Olivier Bonaventure, Gembloux (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/505,196

(22) Filed: Feb. 16, 2000

(30) Foreign Application Priority Data

Feb. 16, 1999 (EP) .............................. 99400375

(51) Int. Cl.$^7$ ................................. H04J 3/14
(52) U.S. Cl. .................. 370/235; 370/395.21; 370/433; 370/468
(58) Field of Search ................................. 370/235, 468, 370/229–230, 230.1, 395.21, 399, 431, 433, 465

(56) References Cited

U.S. PATENT DOCUMENTS

| 6,188,698 B1 | * | 2/2001 | Galand et al. | 370/412 |
| 6,205,149 B1 | * | 3/2001 | Lemaire et al. | 370/401 |
| 6,377,583 B1 | * | 4/2002 | Lyles et al. | 370/412 |
| 6,381,214 B1 | * | 4/2002 | Prasad | 370/230.1 |

FOREIGN PATENT DOCUMENTS

EP           0 472 154 A2      2/1992

OTHER PUBLICATIONS

Dumortier P.: "Toward a /New IP Over ATM Routing Paradigm" IEEE Communications Magazine, vol. 36, No. 1, Jan. 1, 1988, pp. 82–86, XP000739156.

* cited by examiner

*Primary Examiner*—Dang Ton
*Assistant Examiner*—Inder Pal Mehra
(74) *Attorney, Agent, or Firm*—Sughrue Mion, PLLC

(57) ABSTRACT

A data traffic policer (POL) included in a telecommunication network, to police data traffic which includes data packets that are part of a lower order data flow that is on its turn part of a higher order data flow. Each data packet is associated to a lower order identifier (LOI) that identifies the lower order data flow and to a higher order identifier that (HOI) identifies the higher order data flow. The policer (POL) includes first determiner (DET1) coupled to an input of the policer (POL) to determine, upon reception of a data packet, its lower order identifier (LOI). A first controller (CTRL1) coupled to the first determiner (DET1) checks a conformance of the data packet according to predefined lower order conformance rules (LOC(LOI)) associated to its lower order identifier (LOI) and provides thereby a lower order conformance result (LOCR) that is lower order conforming or lower order non-conforming. Furthermore the policer (POL) includes second determiner (DET2) coupled to the input to determine the higher order identifier (HOI) that is associated to the data packet and forwards the higher order identifier (HOI) to a second controller (CTRL2). The second controller (CTRL2) checks a conformance of the data packet according to predefined higher order conformance rules (HOC(HOI)) associated to the higher order identifier (HOI) and provides a higher order conformance result (HOCR) that is higher order conforming or higher order non-conforming. The policer (POL) includes declarer (DECL) coupled between the first controller (CTRL1), the second controller (CTRL2) and an output (OUT) of the policer (POL). The declarer (DECL) declares, in the event when the lower order conformance result (LOCR) is lower order non-conforming, and the higher order conformance result (HOCR) is higher order conforming, the data packet as conforming. As a result, when being transmitted, the data packet uses some leftover bandwidth from another lower order data flow within the higher order data flow. After the heading, delete the title in its entirety.

7 Claims, 1 Drawing Sheet

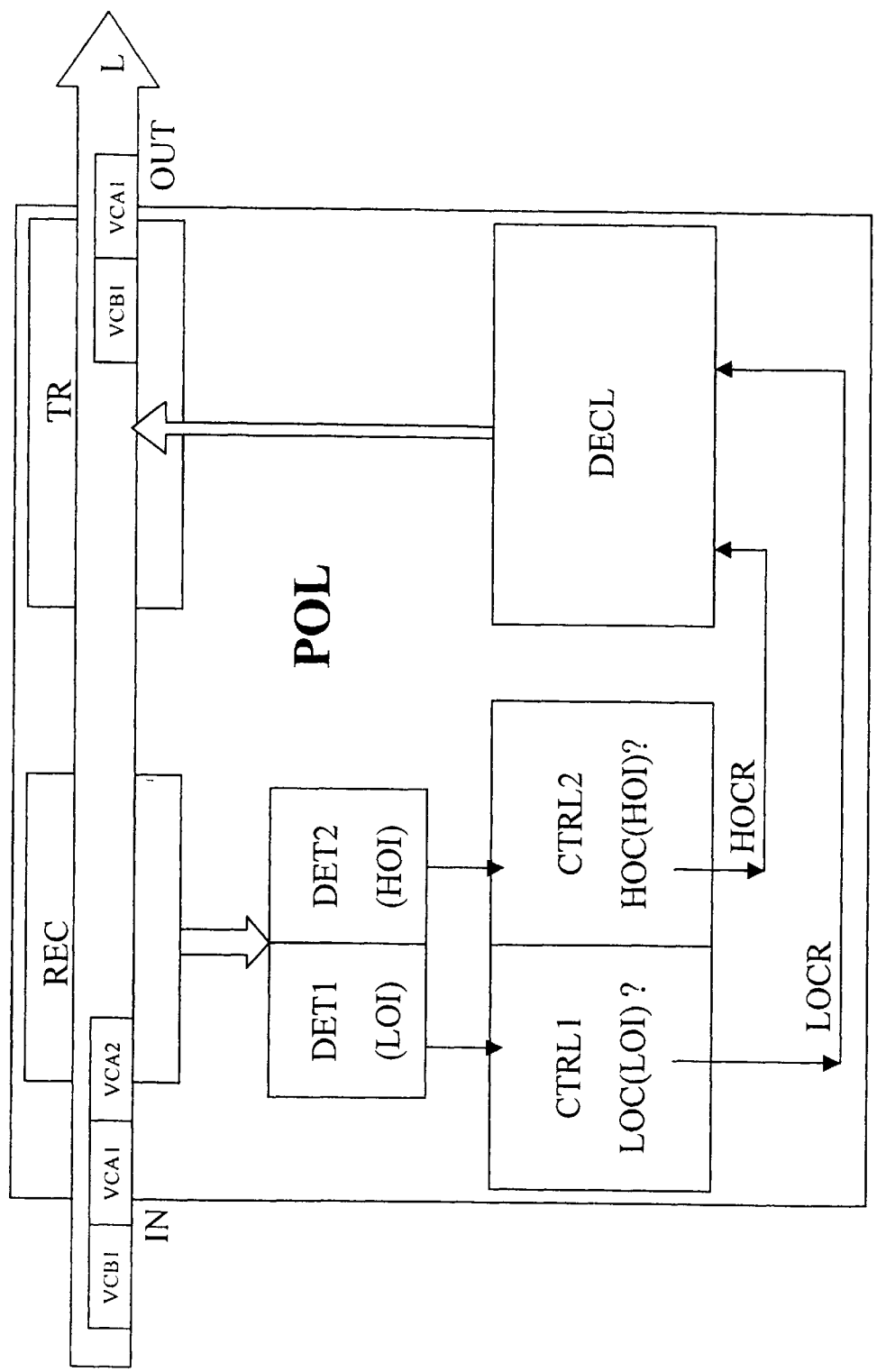
Figure

METHOD FOR POLICING DATA TRAFFIC, A DATA TRAFFIC POLICER REALIZING SUCH A METHOD AND A TELECOMMUNICATION NETWORK INCLUDING SUCH A POLICER

BACKGROUND OF THE INVENTION

The present invention relates to a method to be used in a telecommunication network for policing data traffic to a data traffic policer realizing such a method and to a telecommunication network including such a data traffic policer.

Such a method for policing data traffic, such a data traffic policer and such a telecommunication network are already known in the art, e.g. from the article "The Spacer-controller: an efficient UPC/NPC for ATM networks", by P. E. Boyer et al., ISS 1992, October 1992, Vol. 2, paper A9.3, pp. 316–320. Referring to the introductory part it is described that asynchronous transfer mode ATM cells are inserted by a user on the network access multiplex, called hereafter a common data communication link, according to any arbitrary timing. Therefore, the allocation of network resources to a connection can only be based upon traffic parameters declared by the user. Call admission implies the negotiation of a Traffic Contract that describes as well as can be the traffic that will be offered at the network entry point. A policing function is used by the network in order to ascertain that the negotiated values are actually met during the connection. On the other hand, the network is bounded to meet the Quality Of Service requested in the Traffic contract by properly allocating resources to the connection. The mentioned article further addresses the integration of a policer and a shaper into the same hardware device.

It is well know to a person skilled in the art that an essential step to be executed by such a known policer is, upon reception of a data packet, determining the lower order identifier that is associated to the data packet, whereby that lower order identifier identifies a lower order data flow e.g. in an ATM network determining the predefined virtual channel identifier that is associated to the ATM cell whereby this virtual channel identifier identifies the ATM virtual connection. Indeed, within a predefined higher order data flow being identified by a higher order identifier e.g. within a predefined virtual path being identified by a predefined virtual path identifier, it is an essential step to identify the traffic contract associated to this particular received data packet. This step is executed by the policer by means of a first determining means. Furthermore the policer checks the conformance of the data packet according to predefined lower order conformance rules i.e. a traffic contract associated to the lower order identifier. This function is executed by a first control means whereto the lower order identifier is forwarded by the first determining means. The first control means provides hereby a lower order conformance result that is lower order conforming or lower order non-conforming.

A problem outstanding with this kind of policers is that the known policing units, e.g. such as described above in an ATM network, perform policing at Virtual Channel level i.e. at lower order identifier level or at Virtual Path level i.e. at higher order identifier level. This means that policing is performed only at a single identifier level. The resources that are reserved for some predetermined lower order data flow with a lower order identifier, but which are not actually used are wasted. This is not desirable, especially for quality of services QOS such as Variable Bit Rate VBR and guaranteed Frame Rate GFR, the available bandwidth could be useful to other active lower order data flows of this higher order data flow.

This will become more clear with the following example of two Local Area Networks LAN's from different companies A and B, using different Guaranteed Virtual Channels VCA1, VCA2 and VCB1, VCB2, respectively, which are multiplexed in order to share one single ATM link. Presume that VCA1 is used to transport mission critical traffic from company A, VCA2 is used to transport best-effort traffic from company A, VCB1 and VCB2 are used to transport best effort-traffic from company B with two different priorities. Different ways of sharing the available bandwidth of the common link are possible. Under the assumption that a VC is active or inactive and that an active VC is always greedy and in the event when the VCA1 is inactive, the bandwidth that is unused by this VCA1 is distributed among VCA2, VCB1 and VCB2. However, such a distribution of the available bandwidth is not appropriate from a user's point of view e.g. company A, especially as in many networks the charging is done on the basis of the amount of reserved bandwidth.

SUMMARY OF THE INVENTION

An object of the present invention is to provide a data traffic policer such as the above know policers but with an improved and fair use of the available bandwidth.

This object is achieved by the method for policing data traffic as described in claim 1, by the data traffic policer that is realizing such a method that is described in claim 6, and by the telecommunication network that includes such a policer that is described in claim 7.

Indeed, the invention is based on the insight that left-over available bandwidth of a predefined higher order data flow can be shared among all the active lower order data flows being part of this higher order data flow e.g. left-over bandwidth of a virtual path can be shared to all the active virtual channels included inside this virtual path.

The higher order identifier associated to the data packet is also determined by a second determining means of the policer. This higher order identifier is forwarded to a second control means that checks a conformance of the data packet according to predefined higher order conformance rules. The control means provides thereby a higher order conformance result that equals higher order conforming or higher order non-conforming. Furthermore the policer includes declaring means that is coupled between the first control means, the second control means and an output of the policer. The declaring means declares, in the event when the lower order conformance result provided by the first control means is lower order non-conforming, but the higher order conformance result provided by the second control means is higher order conforming, the data packet as conforming. This means that the data packet is allowed to use some leftover resources within this higher order data flow. The leftover resources includes e.g. left-over bandwidth from another lower order data flow within the same higher order data flow and buffer space previously assigned to another lower order data flow within the same higher order data flow.

According to the above mentioned example, company A would clearly prefer that the bandwidth that is not used by VCA1 would automatically be allocated to VCA2 instead of being allocated to VCA2, VCB1 and VCB2. This is realized by also defining a traffic contract with predefined higher order conformance rules for a higher order data flow that includes the lower order data flows VCA1 and VCA2 but not the lower order data flows VCB1 and VCB2. In the event when a data packet of the VCA2 connection arrives and that this data packet has a lower order non-conforming conformance result but a higher order conforming conformance result, the VCA2 data packet is declared as conforming. In this way, the VCA2 connection borrows some leftover bandwidth from the VCA1 connection.

It has to be remarked that according to the above described example in an ATM network, such a higher order data flow is not necessarily a global virtual path that includes the virtual channels VCA1 and VCA2. It should be clear that a higher order data flow might as well be a predefined set of virtual channels whereby bandwidth guarantees are associated to this set of virtual channels so that when one virtual channel is inactive the other virtual channels of the predefined set of virtual channels can benefit from the unused bandwidth. In a similar way and according to the wording of the claims, a higher order data flow can be implemented by a predefined plurality of lower order data flows or by a predefined aggregate of lower order data flows according to the basic principles of the present telecommunication network. In practice it is in fact expected that the invention will be more applied to a logical group of lower order data flows instead of a complete predefined aggregate such as e.g. a virtual path according to the basic principles of ATM networks.

It has to be remarked that although for e.g. guaranteed frame rate GFR service category a virtual path policing is not defined yet, existing variable bit rate VBR traffic policers are presently implemented at the level of a virtual channel identifier VC but also at the level of a virtual path identifier. However, such an implementation for a virtual path is a stand-alone implementation whereby the results of an eventual virtual channel traffic contract are not taken into account and whereby no bandwidth can be borrowed from one included lower order data flow to another included lower order data flow.

It has to be explained that declaring a data packet as being conforming means that according to the strategy of the present operator the data packet is discarded or is marked as non-conforming i.e. tagging a data packet.

Furthermore, it has to be understood that although the declaring means declares the data packet as conforming in the event when the lower order conformance result is lower order non-conforming and the higher order conformance result is higher order conforming, it is not excluded that the policer of the present invention might declare a data packet as conforming in other situations. Indeed, for example, in the event when already the lower order conformance result equals conforming the data packet might be declared immediately as conforming and no bandwidth has to be borrowed by a another lower order data flow that is part of its higher order data flow.

A further feature of the present invention is that the step of checking a conformance of the data packet according to the predefined higher order conformance rules is only executed in the event when the lower order conformance result is lower order non-conforming. This is described in claim 2. Indeed, in order not to overload the actual working of the present policer it might be convenient to implement the policer such that first the checking of the lower order conformance is executed and secondly, only in the event when the lower order checking is non-conforming, the higher order conformance will be checked. However, in the event when the higher order conformance checking implies a modification of some variables upon reception of each data packet, it has to be remarked that although, in the event that a data packet is conforming according to the lower order checking, the policer still needs to increment these variables.

A further characteristic feature is that the step of checking a conformance according to predefined lower order conformance rules includes one or more lower order sub-steps and that the step of checking a conformance according to predefined higher order conformance rules includes one or more higher order sub-steps and that the lower order sub-steps and the higher order sub-steps are executed according to a mixed sequence. The different sub-steps are in fact integrated with each other. This is described in claim 3. Indeed, it should be explained that in order to check a conformance of a data packet, different options are possible to test the data packet according to cell based conformance rules or even more to test the data packet according to frame based conformance rules. For instance e.g. a Guaranteed Frame Rate GFR conformance definition is taking into account packet related features such as the Cell Loss Priority bit, the Peak cell Rate and the Cell Delay Variation Tolerance, and also frame related features such as the Maximum Frame Size. Furthermore, more than one conformance test is executed in order to complete a lower order conformance check or a higher order conformance check according to the present invention, whereby a predefined structure is brought into the sequence of the different conformance tests. In order to avoid complexity the different steps of the higher order conformance check and different steps of the lower order conformance check are executed in a mixed order. It should also be clear that a lower order conformance check includes similar tests as a higher order conformance check. These similar tests should not be repeated for a second time in the event when both conformance checks are to be executed. It should also be clear that it might be convenient to control first e.g. a few higher order conformance tests and later on some lower order conformance tests in order to return thereafter again to control typical higher order conformance tests. For example, it is clear that in the event when for a GFR Guaranteed Frame Rate contract a predefined maximum frame size MFS for the higher order traffic contract and for the lower order traffic contract are equal, that once this test is executed the result of the test is valid as well for the lower order conformance check as for the higher order conformance check.

Furthermore, it should be explained that a telecommunication network that includes a data traffic policer according to the present invention supports different kinds of Quality Of Service Categories whereby the conformance is checked according to the conformance definitions of the supported service category. Such a supported service category is e.g. the unspecified Bit Rate service category or the Guaranteed Frame Rate Service Category.

Two possible implementations of a telecommunication network of the present inventions are described in claim 4 and 5. Claim 4 describes an asynchronous transfer mode network whereby the lower order identifier is a virtual channel identifier and claim 5 describes an internet network that is working with an hierarchy of identifiers.

Another example is Multi-Protocol Label Switching MPLS as described in e.g. in the book "Switching in Ip Networks *IP Switching Tag Switching*, and *Related Technologies*" written by Bruce Davie, Paul Doolan, Ytakov Rekhter and published by The Morgan Kaufmann Series in Networking, David Clark, Series Editor in May 1998 with ref. ISBN 1-55860-505-3.

Referring to the internet network and Multi Protocol Label Switching MPLS, a possible implementation of the present invention is that the internet network is using a principle whereby the lower order identifier is a lower order label.

With the example of this multi-protocol label switching implementation and also the example described in a following paragraph the next remark becomes clear. Indeed, it is remarked that the present invention is not restricted to the use of only one lower order conformance check and only one higher order conformance check. Indeed, a higher order data flow can on its turn be part of a third order data flow whereby it is possible to borrow bandwidth from one higher order data flow to another higher order data flow as long that they both are part of the same third order data flow wherefore the result of the conformance check is conforming. Multi-protocol label switching is working with labels that are short, fixed length, physically contiguous and locally significant identifiers that are each identifying a data stream. The essential point about labels is that all the data packets with the same label will receive a same forwarding treatment i.e. forwarded on the same port, with the same next hop label, if any, and using the same encapsulation. The granularity of elements associated with labels can vary widely. On one hand a label can represent Internet Traffic flows, explicit routes or host routes. On the other hand, it could represent an egress identifier or an egress router in case of IP unicast or it could represent a multicast tree in case of IP multicast. Another example of the granularity of a conformance check is again in an ATM network with at the lowest order a virtual channel conformance traffic contract, hereafter within a virtual path, a logical group of virtual channels conformance traffic contract and at a third order a virtual path conformance traffic contract. In this way it is clear that the present invention can be applied for a predefined granularity of identifiers of different orders.

Another possible implementation in an internet network with a granularity of identifiers is realized according to the following hierarchy:

a higher order data flow being identified by a source address and a destination address, that includes one or more first lower order data flows being identified by source address, destination address and transport protocol, that includes:

one or more second lower order data flows being identified by source address, destination address, transport protocol and source port, that includes:

one or more third lower order data flows being identified by source address, destination address, transport protocol, source port and destination port, that includes one ore more fourth order data flows being identified by source address, destination address, transport protocol, source port, destination port and file type such as an html file or a video file.

It should be noticed that the term "including", used in the claims, should not be interpreted as being limitative to the means listed thereafter. Thus the scope of the expression "a device including means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and in input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying FIGURE that represents an embodiment of a data traffic policer.

DETAILED DESCRIPTION OF THE INVENTION

First the working of the data traffic policer of the invention will be explained by means of a functional description of the functional blocks shown in the FIGURE. Based on this description, implementation of the functional blocks will be obvious to a person skilled in the art and will therefor not be described in further detail. In addition, the principle working of the method for policing data traffic will be described.

Referring to the FIGURE, a data traffic policer POL is shown. The data traffic policer POL is preferred to be included in a ATM communication network on a data communication link L. The data communication link data transports packets i.e. ATM cells. In order not to overload the FIGURE only a few data packets are shown. Each one of these data packets is part of a virtual channel i.e. lower order data flow whereby each data packet is associated to a virtual channel identifier i.e. lower order identifier. Such a virtual channel identifier is e.g. VCA1, VCA2, VCB1 and VCB2. Referring to the FIGURE, for each shown data packet its lower order identifier is mentioned in the data packet e.g. VCA2. In this way, the communication link L is commonly used by the lower order data flows that are associated to the lower order identifiers VCA1, VCA2, VCB1 and VCB2.

Presume a situation that the lower order data flows with lower order identifiers VCA1, VCB2, VCB1 and VCB2 are actually established. At connection set up of each lower order data flow also a lower order data traffic contract is defined. These lower order data traffic contracts are referred to by the lower order identifier e.g. VCA2 that is associated to the lower order data flow. Furthermore, the data traffic policer POL of this preferred embodiment is equipped with the ability to provide policing of data traffic according to a traffic contract associated to a lower order identifier and to provide policing of data traffic according to a traffic contract associated to a higher order identifier. For this preferred embodiment the level of the higher order data policing function is preferred to be on the level of a virtual path. The virtual path identifier of the virtual path i.e. higher order identifier is the reference in order to identify the traffic contract of the higher order data traffic policing.

In order not to overload the FIGURE the indications to the higher order data flow are included in the notations of the lower order data flow identifiers: lower order identifier VCA2 is part of the higher order data flow that is referred to with the higher order identifier A and lower order identifier VCB1 is part of the higher order data flow that is referred to with the higher order identifier B.

The data traffic policer POL includes an input IN and an output OUT. Furthermore the data traffic policer POL includes a receiver REC, a transmitter TR, a first determiner DET1, a second determiner DET2, a first controller CTRL1, a second controller CTRL2 and a declaring device DECL.

The input IN and the output OUT of the policer POL are both coupled to the common communication link L.

The receiver REC is coupled to the input IN and to the first determiner DET1 and to the second determiner DET2.

The first determiner DET1 is coupled to the first controller CTRL1 and the second determiner DET2 is coupled to the second controller CTRL2.

Both controllers CTRL1 and CTRL2 are coupled to the declaring device DECL that on its turn is coupled to the transmitter TR.

Finally the transmitter TR is coupled to the output OUT of the data traffic policer POL.

The receiver REC receives the incoming data packets being transported over the common communication link L. Upon reception of a data packet, the receiver REC provides the information of the header part of this data packet i.e. ATM header to the first determiner DET1 and to the second determiner DET2.

The first determiner DET1 determines by means of the received header information the lower order identifier LOI and provides it to the first controller CTRL1.

The second determiner DET2 determines by means of the received header information the higher order identifier HOI and provides it to the second controller CTRL2.

The first controller CTRL1 executes a lower order conformance checking LOC according to the predefined lower order conformance rules being defined in the traffic contract that is referred to by the received lower order identifier LOC(LOI). The first controller CTRL1 provides hereby a lower order conformance result LOCR that equals lower order conforming or lower order non-conforming. This lower order conformance result LOCR is forwarded to the declaring device DECL.

The second controller CTRL2 executes a higher order conformance checking HOC according to the predefined higher order conformance rules being defined in the traffic contract that is referred to by the received higher order identifier HOC(HOI). The second controller CTRL2 provides hereby a higher order conformance result HOCR that equals higher order conforming or higher order non-conforming. This higher order conformance result HOCR is forwarded to the declaring device DECL.

In the event when the received lower order conformance result equals non-conforming and the received higher order conformance result equals conforming, the declaring device declares the received data packet as conforming. Since other situations according to other conformance results are going beyond the aim of the invention, the functionality of the declaring means according to these further situations is not described here in further detail.

When the declaring device declares the received data packet as conforming, the data packet might be transmitted on the communication link L. The declaring device DECL forwards a permission signal to the transmitter TR and the transmitter TR transmits the conforming data packet on the communication link L.

In order to explain the functional working of the present invention a preferred situation will be described in details by means of an example.

Presume a situation whereby:
  the higher order data flow with higher order identifier A includes only two lower order data flows with lower order identifiers VCA1 and VCA2.
  the data packets of the lower order data flow with lower order identifier VCA1 are transmitted by a source (not shown) at a transmission rate far below the contractual minimum data packet rate; and
  the data packets of the lower order data flow with lower order identifier VCA2 are transmitted by another source (not shown) at a transmission rate equal to its contractual maximum packet rate; and
  these data packets are also included in the higher order data flow with higher order identifier A are transmitted at a data packet rate that is still within the contractual bandwidth limits.

Referring to the FIGURE, it is shown that a data packet is just received by the receiver REC of the data traffic policer POL i.e. data packet VCA2. The receiver provides the header information of this data packet to the first determiner DET1 and to the second determiner DET2. According to the predefined nomenclature the first determiner DET1 determines the lower order identifier LOI=VCA2 and the second determiner DET2 determines the higher order identifier HOI=A. Both identifiers LOI=VCA2 and HOI=A are forwarded to the first controller CTRL1 and to the second controller CTRL2, respectively.

The first controller CTRL1 checks a conformance of the received data packet according to predefined lower order conformance rules LOC(LOI=VCA2) associated to the lower order identifier VCA2 and provides thereby a lower order conformance result LOCR that equals non-conforming.

The second controller CTRL2 checks a conformance of the received data packet according to predefined higher order conformance rules HOC(HOI=A) associated to the higher order identifier A and provides thereby a higher order conformance result HOCR that equals conforming.

Both results LOCR and HOCR are forwarded to the declaring device that declares, according to its predefined functionality, the data packet as conforming.

In this way the data packet from the lower order data flow with VCA2 identifier borrows some leftover bandwidth from the data flow with VCA1 identifier. All of this happens under the control of a predefined traffic contract of a higher order data flow with a higher order identifier A which includes both lower order data flows with lower order identifiers VCA1 and VCA2.

It has to be remarked that the present policer according to this described embodiment can easily be adapted to use it also for applications where the higher order identifier is a logical group of lower order identifiers. Indeed, in stead of forwarding the header information also to the second determiner DET2, it is for such an application more efficient to forward by the first determiner DET1 the virtual channel identifier that is extracted from the header information to the second determiner DET2. Thereby the second determiner DET2 is able to determine a higher order identifier that is associated to this lower order identifier. The higher order identifier is associated to a logical group of lower order identifiers including this lower order identifier. In this way the higher order identifier is determined due to information of the lower order identifier.

A further remark is that the policer of this present embodiment can be made more efficient by activating the higher order conformance check of the second controller CTRL2 only in the event when the lower order conformance result of the first controller CTRL1 equals non-conforming. Indeed, such a prosecution of the different steps provides the advantage that in the event when the lower order conformance result equals conforming the result is directly provided to the declaring device that is adapted to declare the data packet, in such an event, directly as conforming. However, it should be noted that according to such an implementation, a modification of the internal state of the higher order conformance checking should still be updated by e.g. incrementing the related variables.

Finally it should be noted that although the above described embodiment of the policer is described in an ATM telecommunication network, the application of the present invention is not reduced to such an application. Indeed, small modification evident to a person skilled in the art, may be applied to the above described embodiment in order to adapt it to be used in other kind of telecommunication networks like e.g. an internet network that for instance uses a multi-protocol label switching principle in order to transmit its data.

While the principles of the invention have been described above in connection with specific apparatus, it is to be clearly understood that this description is made only by way of example and not as a limitation on the scope of the invention, as defined in the appended claims.

What is claimed is:

1. A method to be used in a telecommunication network by a data traffic policer (POL) for policing data traffic on a data communication link (L), said data traffic including one or more data packets, each one of said data packets being part of a lower order data flow and said lower order data flow being part of a higher order data flow, whereby said each one of said data packets is associated to a lower order identifier (VCA1, VCA2, VCB1, VCB2) that identifies said lower order data flow and to a higher order identifier that identifies said higher order data flow, said method comprising the steps of:

upon reception a data packet of one of said data packets by said policer (POL), determining said lower order identifier (LOI) being associated to said data packet; and checking a conformance of said data packet according to predefined lower order conformance rules (LOC(LOI)) being associated to said lower order identifier (LOI) and providing thereby a lower order conformance result (LOCR) of said data packet being any one of lower order conforming) and lower order non-conforming, characterized in that said method further includes determining said higher order identifier (HOI) being associated to said data packet; and checking a conformance of said data packet according to predefined higher order conformance rules (HOC (HOI)) being associated to said higher order identifier (HOI) and providing thereby a higher order conformance result (HOCR) of said data packet being any one of higher order conforming and higher order non-conforming; and in the event when said lower order conformance result (LOCR) is lower order non-conforming but said higher order conformance result (HOCR) is higher order conforming, declaring said data packet as being conforming, whereby said data packet whilst being transmitted uses some left-over resources within said higher order data flow.

2. The method according to claim 1, characterized in that said step of checking a conformance of said data packet according to predefined higher order conformance rules (HOCR) is executed in the event when said lower order conformance result being lower order non-conforming.

3. The method according to claim 1, characterized in that said step of checking a conformance according to predefined lower order conformance rules (LOC(LOI)) includes one or more lower order sub-steps and that said step of checking a conformance according to predefined higher order conformance rules includes one or more higher order sub-steps and that said lower order sub-steps and said higher order sub-steps being executed according to a mixed sequence.

4. The method according to claim 1, characterized in that said telecommunication network is an asynchronous transfer mode network whereby said lower order identifier (LOI) is a virtual channel identifier (VCA2).

5. The method according to claim 1, characterized in that said telecommunication network is an internet network and that said internet network is working with an hierarchy of identifiers.

6. A data traffic policer (POL) for use on a data communication link (L) in a telecommunication network to police data traffic being transmitted via said data communication link (L), said data traffic includes one or more data packets whereof each one is part of a lower order data flow and said lower order data flow is part of a higher order data flow, each one of said one or more data packets being thereby associated to a lower order identifier (LOI) that identifies said lower order data flow and to a higher order identifier (HOI) that identifies said higher order data flow, said policer (POL) includes first determining means (DET1) being coupled to an input (IN) of said policer (POL) and included to determine, upon reception of a data packet of one of said data packets by said policer (POL), said lower order identifier (LOI) that is associated to said data packet, and a first control means (CTRL1) coupled to said first determining means (DET1) to check a conformance of said data packet according to predefined lower order conformance rules (LOC(LOI)) associated to said lower order identifier (LOI) being provided by said first determining means (DET1) to said first control means (CTRL1) and to provide thereby a lower order conformance result (LOCR) that is any one of lower order conforming and lower order non-conforming, characterized in that said policer (POL) further includes second determining means (DET2) being coupled to said input (IN) in order to determine said higher order identifier (HOI) that is associated to said data packet and to provide said higher order identifier (HOI) to a second control means (CTRL2) being coupled thereto, said second control means (CTRL2) to check a conformance of said data packet according to predefined higher order conformance rules (HOC(HOI)) being associated to said higher order identifier (HOI) and to provide thereby a higher order conformance result (HOCR) that is any one of higher order conforming and higher order non-conforming, and declaring means (DECL) coupled between said first control means (CTRL1), said second control means (CTRL2) and an output (OUT) of said policer (POL) to declare, in the event when said lower order conformance result (LOCR) provided by said first control means (CTRL1) is lower order non-conforming, and said higher order conformance result (HOCR) provided by said second control means (CTRL2) is higher order conforming, said data packet as conforming, whereby said data packet when being transmitted uses some left-over resources within said higher order data flow.

7. A telecommunication network characterized in that said telecommunication network includes at least one data traffic policer (POL) according to claim 6.

* * * * *